US005562823A

United States Patent [19]

Reeves

[11] Patent Number: 5,562,823

[45] Date of Patent: Oct. 8, 1996

[54] COMBINATION CENTRIFUGAL AND SONIC DEVICE FOR SEPARATING COMPONENTS WITHIN A SOLUTION

[76] Inventor: William Reeves, 129 Peddler's Dr., Branford, Conn. 06405

[21] Appl. No.: 232,645

[22] Filed: Apr. 25, 1994

[51] Int. Cl.[6] .......... B01D 17/06; B01D 21/26

[52] U.S. Cl. .......... 210/243; 210/294; 210/380.1; 422/72; 494/16

[58] Field of Search .......... 204/186, 302; 210/243, 512.1, 748, 787, 515, 516, 517, 360.1, 361, 294, 380.1, 382; 422/72; 494/16

[56] References Cited

U.S. PATENT DOCUMENTS

| | | | |
|---|---|---|---|
| 3,779,451 | 12/1973 | Lehman | 494/16 |
| 3,957,650 | 5/1976 | Petrushkin et al. | 210/748 |
| 5,225,089 | 7/1993 | Benes et al. | 210/748 |

*Primary Examiner*—Robert A. Dawson
*Assistant Examiner*—David A. Reifsnyder

[57] ABSTRACT

The present invention relates to an improved device and method for separating a first component in a solution from a second component in the solution. The device comprises a centrifuge for applying centrifugal force to the solution and at least one transducer for emitting a sonic energy force such as an ultrasonic wave into a container of the solution while the centrifuge is rotating. The method of the present invention broadly comprises the steps of applying a centrifugal force to the solution to separate the first component from the second component and simultaneously applying a sonic energy force to the solution to speed up the separation of the first component from the second component. A tool for removing transducers from the device is also disclosed.

34 Claims, 6 Drawing Sheets

COMBINATION CENTRIFUGAL AND SONIC DEVICE FOR SEPARATING COMPONENTS WITHIN A SOLUTION

BACKGROUND OF THE INVENTION

The present invention relates to an improved device and method for separating components within a solution, which device and method have particular utility in cell separation, internal component cell separation and genetic engineering applications.

The process of centrifugation and centrifuges as devices have long existed for biomedical applications such as cell separation, internal component cell separation, and genetic engineering. Centrifugation processes and centrifuges rely on centrifugal forces acting on cells, cell mixtures, body fluids and the like suspended in an aqueous solution to overcome many of the forces associated with the cells or other particles suspended in the solution. By virtue of spinning the solution at high speeds, the centrifugal force necessary to separate a particular cell structure is generated.

Over the last forty years, many attempts have made to improve the efficiency of the centrifugation process. These attempts have included: increasing the speed at which solutions are spun; providing continuous flow type rotors, adapters and centrifuges which continuously process large amounts of solution; increasing the size of the rotors, tubes and bottles used in the devices; and engineering stronger rotors to enable more solution to be spun at once. Other efforts to improve the efficiency of centrifugation have included fixed angle rotors, swinging bucket rotors, zonal rotors and tube and bottle embodiments which allow a scientist to more precisely extract a desired piece of cell tissue from a given solution with accurate and predictable results. Despite all these improvements, the basic process has not been altered—the force which acts on the cells and the solutions during centrifugation remains centrifugal force.

Another set of devices used to separate cell membranes from cells are known as sonicators. These devices utilize sonic waves instead of centrifugal force. In these devices, transducers for generating sonic waves are immersed in a solution containing the cells.

Ultrasound energy has been used in a number of different medical applications. Many common forms of diagnostic imaging use low powered ultrasound energy to image the heart and other human organs as well as image human fetuses. Ultrasound by its very nature acts to excite, vibrate, heat, and in some very high energy levels, cavitate cells and cell tissue. The effects of ultrasound on cell particles and tissues in steady state and pulsed conditions are well documented. In fact, ultrasound is now used in sonification techniques to pre-rupture cell membranes. The power, frequency, and amplitude of sonic waves determine the degree of cellular and subcellular excitation, liquid heating, cell vibration and possible cavitation.

Despite the existence of this technology, there still remains a need to improve cell separation techniques. Entire new sciences including genetic engineering, have resulted from more precise techniques to isolate and remove subcellular and in some uses submolecular, organic matter.

SUMMARY OF THE INVENTION

Accordingly, it is an object of the present invention to provide an improved device for separating components in a solution which increases the speed of the separation process and makes it more efficient.

It is a further object of the present invention to provide an improved device as above which utilizes centrifugation and which reduces the amount of centrifugal force necessary to separate components in a solution.

It is still a further object of the present invention to provide an improved device as above which reduces the heat generated during a separation process.

It is yet a further object of the present invention to provide an improved method for separation of components in a solution during which both centrifugal forces and sonic energy forces are simultaneously applied to the components in a solution undergoing separation.

It is yet another object of the present invention to provide a method as above which allows the separation of cell components in a solution by density gradient.

Still further objects of and advantages attendant to the apparatus and process of the present invention are set out in the following description.

In accordance with the present invention, an improved device for separating components within a solution, such as one type of cell from another, cell membranes from cells, subcellular particles from each other, is provided. The device includes means for applying a centrifugal force to the solution to separate a first component in the solution from a second component and means for simultaneously applying a sonic energy force, preferably an ultrasonic energy force, to the solution so as to speed up the separation of the first component from the second component. The centrifugal force applying means comprises a centrifuge device having a rotor body and a plurality of tube cavities, tubes and/or receptacles for receiving the solution with the components to be separated. The sonic energy force applying means comprises at least one transducer positioned to direct sonic energy forces into the solution. In a first embodiment, the sonic energy force applying means comprises a plurality of transducers arranged so as to aim the sonic waves radially inwardly into the solution. In a second embodiment, the sonic energy force applying means comprises a plurality of transducers mounted within the cap(s) covering the solution containing tube(s). The transducers are positioned so as to transmit sonic waves longitudinally into the tubes. In a third embodiment, the sonic energy force applying means comprises an array of transducers located within the base or the lid of a receptacle containing a plurality of solution containing tubes. In a fourth embodiment, the sonic energy force applying means comprises sonic horns mounted on the rotor, which horns are immersed a given length directly into the solution to input sonic energy during centrifugation.

The method of the present invention broadly comprises applying a centrifugal force to a solution to separate a first component in the solution from a second component and simultaneously applying a sonic energy force to said solution so as to speed up the separation of the first component from the second component and reduce the amount of centrifugal force which need be applied.

Other details of the device and the method of the present invention are set forth in the following description and the accompanying drawings in which like reference numerals depict like elements.

DETAILED DESCRIPTION

Figure 1:
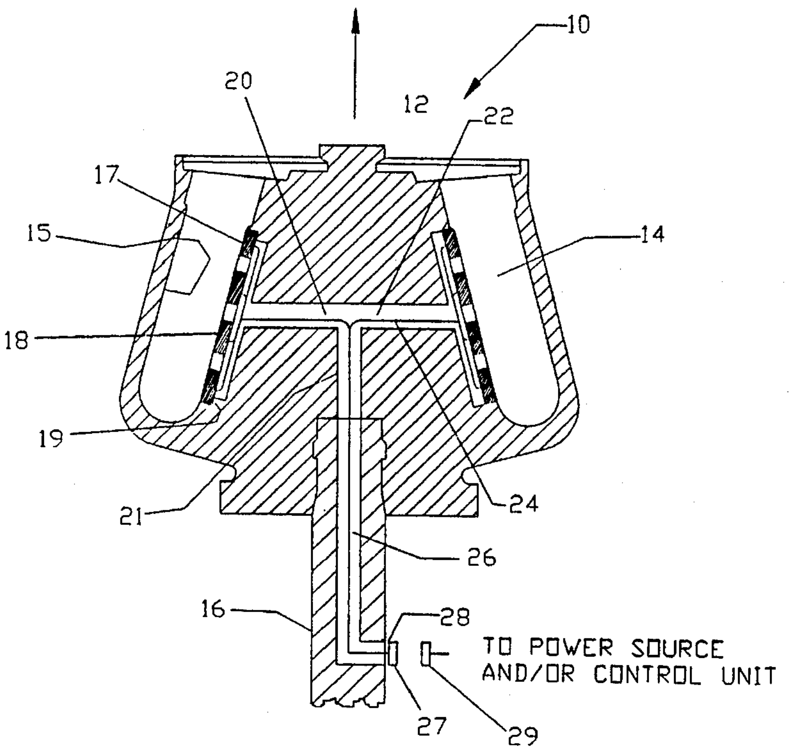
FIG. 1 is a sectional view of a fixed angle rotor centrifuge device in accordance with the present invention having a first transducer arrangement.

Referring now to the drawings, FIG. 1 illustrates a first centrifuge device in accordance with the present invention. The centrifuge device 10 is known as a fixed angle rotor device. It has a rotor body 12 with a plurality of tube cavities 14 machined in the rotor body at a desired angle with respect to the rotational axis A of the rotor body. The tube cavities 14 each receive a closed tube or container having a solution with components to be separated. The rotor body 12 may be rotated at a desired speed by a motor (not shown) and a drive shaft 16 connecting the motor and the rotor body 12. The drive shaft 16 may be connected to the motor and the rotor body 12 using any suitable conventional connection system known in the art.

A plurality of transducers 18 are provided for emitting sonic waves in a radial direction. The transducers 18 may be arranged within the rotor body 12 in a variety of different configurations. For example, a stack of transducers 18 may be embedded within a polymer epoxy or powder material for preventing mechanical creep or fatigue. This array of transducers may then be shaped to conform to the shape of a wall 19 of the rotor body. The transducer array may then be mounted on the wall 19 using a suitable adhesive. Alternatively, the wall 19 may have a groove 17 for the transducers machined therein and the array may be placed within the groove. In yet another variation, the rotor body may have a plurality of circumferential grooves and a plurality of transducers may be placed within each of the grooves at desired locations. In still another variation, an array of transducers 18 may be mounted to an exterior wall 15 of each cavity 14. By mounting the transducers in this manner, the sonic waves or energy forces generated by the transducers are aimed or directed inwardly at the solution within the tubes within the tube cavities 14.

The transducers 18 may each comprise any suitable transducer device known in the art for emitting a desired sonic wave. For example, the transducers 18 may be piezoelectric devices made from a synthetic ceramic material. In such devices, the ceramic material expands or contracts when a voltage is applied. As a result, the device can be excited to vibrate at a desired frequency or within a desired frequency range. In general, frequency range and sonic energy concentration are controlled by the diameter, thickness, and shape of the ceramic material forming the transducer.

The transducers 18 may also be of the type which emit a pulsed or a steady state sonic wave. Still further, the transducers 18, in lieu of being passive emitters which only emit sonic waves and do not capture them, may be a combination emitter/receiver. Combination emitter/receiver transducers are advantageous in that they can be used to regulate the intensity of the sonic energy forces by deflected wave feedback control.

As previously mentioned, the transducers 18 may be pulsed wave or steady state wave transducers. A standing or steady-state wave transducer may be used to cause the migration of cells into bands in a solution at half wavelength intervals. When pulsed wave transducers are used, repetition frequency, period, duration and duty factor are parameters which can be controlled to maximize biological separation.

Most rotor bodies are constructed from a metal such as aluminum, stainless steel, or titanium. If bombarded from the outside by sonic energy forces such as ultrasound waves, most of the sonic energy forces will scatter and not penetrate the metal in a predictable and effective manner. Therefore, it is preferred to mount the sonic transducers 18 inside the rotor to be spun. In order to spin a rotor body 12 with such inner mounted transducers, it is necessary to use a powercord/tube arrangement which enables electrical power or current to be brought to the transducers 18 as the rotor body 12 is spinning at relatively high speeds.

One powercord/tube arrangement which can be used is shown in FIG. 1. It includes a series of channels 20, 21 and 22 machined into the rotor body through which powercords or electrical cables 24 can be passed. The powercord/tube arrangement further includes a channel 26 machined into the drive shaft 16 and an opening 28 for allowing the powercord(s) or electrical cable(s) 24 to be connected to a power source (not shown) and/or a control unit (not shown) via an emitter 27 attached to the cable(s) 24 and a receiver 29 attached to the power source and/or control unit.

To separate a first component from a second component in a solution using the device of FIG. 1, tubes containing the solution with the material to be separated are inserted in the tube cavities 14. The rotor body 12 is then rotated at a speed which causes centrifugal forces to be created at a level sufficient to effect separation of the first component from the second component. Simultaneous with the rotation of the rotor body 12, electrical power is applied to the transducers 18. The electrical power causes the transmitters to emit sonic energy forces at a desired frequency or within a desired frequency range, preferably a frequency within the ultrasound range of frequencies. The sonic energy forces are directly radially toward the solution and the cell components therein. Together with the centrifugal forces, the sonic forces cause the first component to separate from the second component.

Power, frequency, and amplitude of sonic energy waves such as ultrasonic energy waves, determine the degree of cellular and subcellular excitations, liquid heating, cell vibration and possible cavitation. By varying the power, frequency and amplitude of the sonic waves, one can create an acceptable environment where cells and their suspension solutions are excited to the point where the solution viscosity is lowered, the cells vibrate in an orbital path without rupturing, heating or otherwise damaging the integrity of the cells in question. This net effect, during the centrifugation process, will be to lower the frictional force and the buoyancy force which a particle has to overcome in order to migrate and settle in an acceptable pattern.

Figure 2:
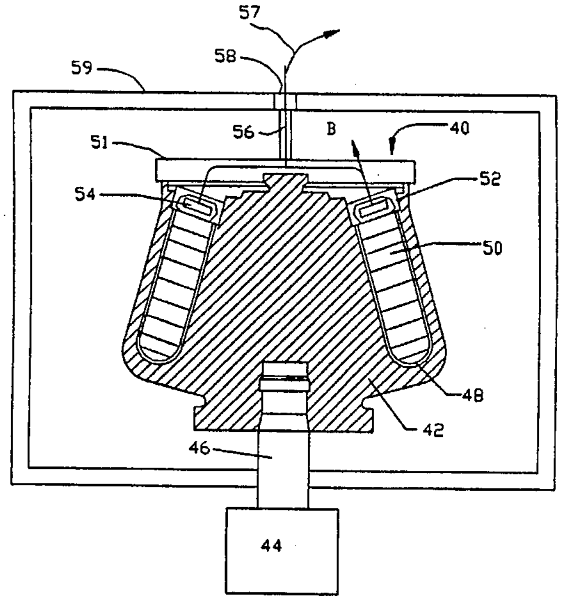
FIG. 2 is a sectional view of a fixed angle rotor centrifuge device in accordance with the present invention having an alternative transducer arrangement.

FIG. 2 illustrates another centrifuge device 40 having a fixed angle rotor body 42. The rotor body 42 is mounted to a power source or motor 44 by a shaft 46. The motor 44 causes the rotor body to rotate at a desired speed. As before, the rotor body 42 has a plurality of tube cavities 48 machined therein at a desired angle. The tube cavities 48 each receive a tube 50 containing a solution with components to be separated. Each solution containing tube 50 is provided with a cap 52 for preventing the contents therein from spilling out during centrifugation. The cap 52 is typically formed from a metal such as aluminum or steel. The device 40 is preferably mounted within a cover arrangement 51 for safety reasons and to prevent spillage of solution being processed.

In this embodiment, a transducer 54 is mounted within each tube sealing cap 52. Each transducer 54 may be any suitable transducer known in the art and may be used to emit either a steady state sonic wave or a pulsed sonic wave. Each transducer 54 is preferably arranged so as to create a longitudinal sonic field in the tube 50 by beaming the sonic waves or energy forces downwardly along the longitudinal axis B of a respective tube 50.

Figure 3:
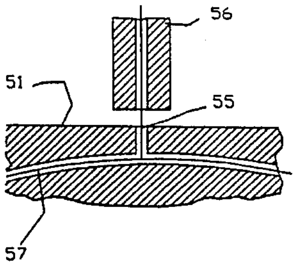
FIG. 3 is a sectional view of a first arrangement for providing electrical power to the transducers in the device of FIG. 2.

FIG. 3 illustrates one approach for providing the transducers 54 with electrical power and/or control signals. In this apparatus, a hollow, stationary shaft 56 is provided which communicates with an opening 58 in a cover arrangement 59 surrounding the centrifuge device 40. One or more cables 57 connected to a power source (not shown) and/or a control source (not shown) for providing power and/or control signals to the transducers 54 are passed through a channel 55 in the cover 51 and then through the shaft 56 and the opening 58.

Figure 4:
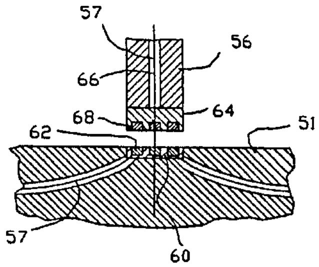
FIG. 4 is a sectional view of a second arrangement for providing electrical power to the transducers in the device of FIG. 2.

Alternatively, as shown in FIG. 4, electrical power and/or control signals may be provided through a distributor cap type arrangement 60 having electrodes 62. The distributor cap arrangement 60 is mounted within the cover 51 and is connected to the transducers 54 by cables 57. The distributor cap arrangement 60 cooperates with a connector 64 attached to the shaft 56. An electrical cable 57' passes through a conduit 66 in the shaft 56 and through the opening 58. The cable 57' is attached to a power source (not shown) and/or control system (not shown). Using this arrangement, power and control signals are sent by a fixed spark to each transducer 54 as a result of the electrodes 62 being excited in a timed sequence by electrodes 68.

If desired, other electrical connection techniques such as induction or conduction of electricity without wires may be used to transmit electricity or power and/or control signals between the transducers 54 and the power source and/or control system. For example, induction coils may be placed in the cover 51 and the stationary shaft 56. The induction coils may be used to create a steady-state or pulsed flux field through which power and/or control signals may be supplied to the transducers.

To separate a first component from a second component in a solution, tubes 50 bearing the solution with the components to be separated are inserted in the tube cavities 48. Each tube is sealed by a cap 52 having a transducer 54 incorporated therein or mounted thereto. Each transducer 54 is oriented so as to direct the sonic energy forces along the longitudinal axis of the tube. The rotor body 42 is then rotated at a speed which causes centrifugal forces to be created which are sufficient to effect separation of the components in the solution. Simultaneous with the rotation of the rotor body 42, electrical power is provided to the transducers 54. The electrical power causes the transducers to emit sonic energy forces at a desired frequency within a desired frequency range, preferably within the ultrasonic frequency range. The sonic energy forces are directed along the longitudinal axis of the respective tube 50 associated with the particular transducer. Together with the centrifugal force, the sonic energy force causes the first component to separate from the second component.

Figure 5:
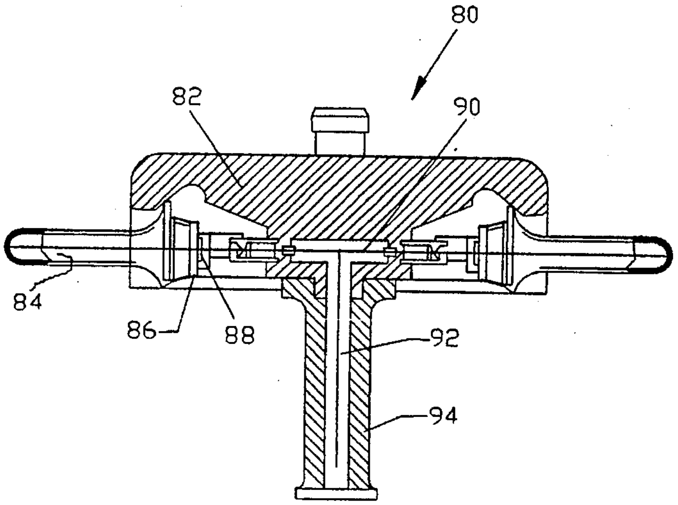
FIG. 5 is a sectional view of a swinging bucket centrifuge device in accordance with the present invention.

FIG. 5 illustrates a swinging bucket type of centrifugation device 80. This device has a rotating body 82 and a plurality of tubes or buckets 84 pivotally mounted to the body 82 so that the buckets 84 rotate outwardly as the rotor body 82 is spun. Each bucket 84 is provided with a cap 86 for sealing the bucket during the spin cycle.

To assist in the separation process, a transducer 88 is provided in each cap 86. Each transducer 88 is oriented so that the sonic waves or energy forces travel along the longitudinal axis of a respective tube 84. As before, each transducer 88 may comprise any suitable sonic energy transmitter/receiver. For example, each transducer 88 may be a piezoelectric device.

To provide electrical power to the transducers 88, one or more electrical wires or solid conductors 90 pass through a channel 92 in a rotary, pedestal support 94 for the centrifugation device 80. The pedestal support 94 may be connected to a motor (not shown) using any suitable means known in the art. The conductors 90 connect the transducers 88 with a power source (not shown) and/or a control system (not shown) via an induction coil arrangement or distributor cap arrangement (not shown) similar to those described above. Alternatively, electrical power can be supplied to the transducers 88 by forming the entire bucket and swing arrangement from an electrically conductive material.

Separation of a first component from a second component within the solutions in the buckets 84, centrifugal force and sonic energy forces, preferably ultrasonic energy forces, are simultaneously applied to the solutions. This is accomplished by rotating the body 82 at a speed sufficient to create centrifugal separation forces and exciting the transducers 88 to generate sonic energy waves at a desired frequency.

Figure 6:
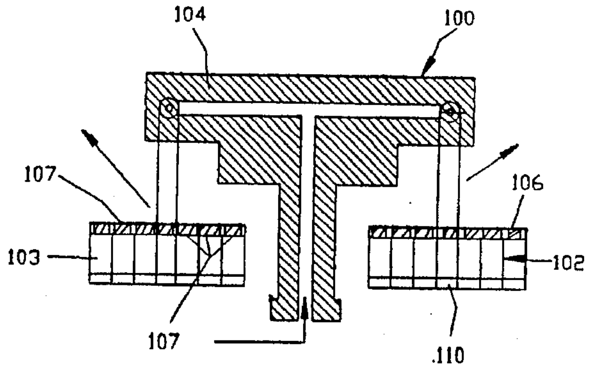
FIG. 6 is a sectional view of an alternative swinging bucket centrifuge device in accordance with the present invention.

FIG. 6 illustrates a variation of a swinging bucket tray rotor centrifugation device 100 having bucket-type receptacles 102 which swing outwardly as the rotor body 104 is spun. Each receptacle 102 has a plurality of chambers or cavities 103 for receiving tubes or vials containing solutions having components to be separated. To prevent spillage of the solution within each receptacle 102, a cap 106 is provided to seal the receptacle(s). In this type of device, transducers 107 for generating the desired sonic energy forces may be embedded as an array 108 within each cap 106 or alternatively within the base 110 of each receptacle 102.

Figure 7:
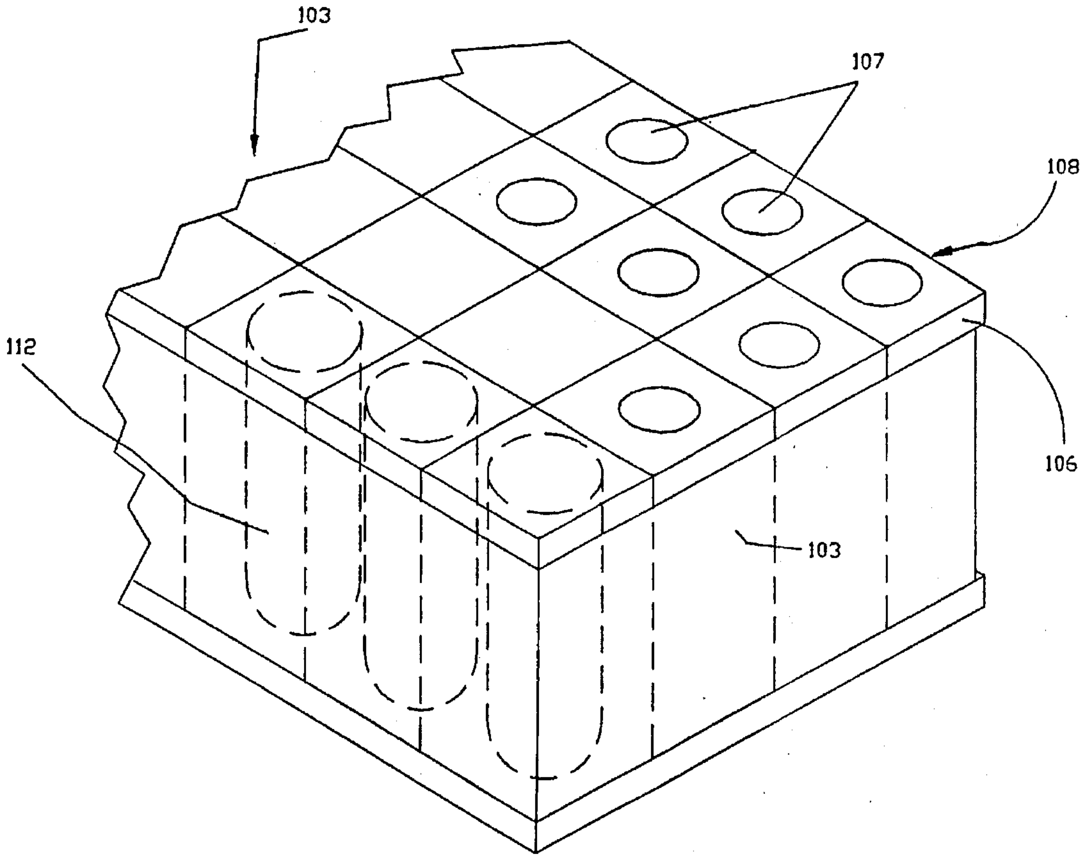
FIG. 7 is a perspective view of a receptacle utilized in the centrifuge device of FIG. 6.

The bucket-type receptacles 102 typically contain a plurality of test tubes 112 in a grid arrangement as shown in FIG. 7. For example, a single receptacle 102 may hold 24 test tubes. In such instances, the array 108 of transducers would include a plurality of transducers equal to the number of test tubes so that one transducer is associated with and positioned directly over or under each test tube. As mentioned above, the transducers may be embedded in the base of the receptacle 102 or in the lid covering the receptacle. The transducers are preferably oriented so as to generate sonic energy forces along the longitudinal axis of each test tube in the receptacle. Power may be provided to the transducers from a battery (not shown) incorporated into the cap or the base or another power source (not shown) via wires or conductor rod assemblies. By providing power via a battery, the need for an external power source can be eliminated.

Once again, separation of the components within the solutions in the vials or tubes is accomplished by simultaneously applying centrifugal forces and sonic energy forces, preferably ultrasonic energy forces.

Figure 8:
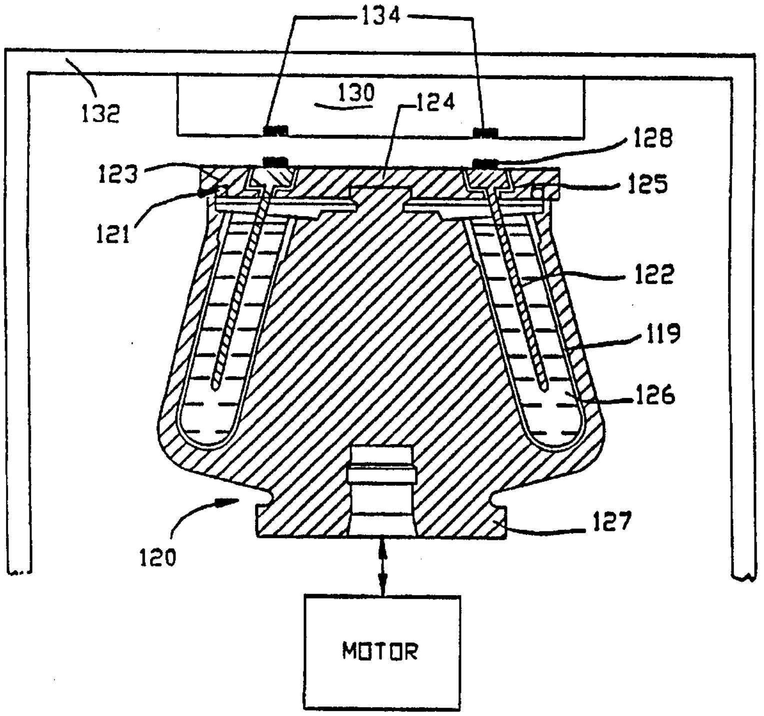
FIG. 8 is a sectional view of yet another centrifuge device in accordance with the present invention having a transducer horn arrangement.

FIG. 8 illustrates yet another centrifuge device 120 in accordance with the present invention. The device 120 includes a rotor body 127 connected to a motor. In operation, the rotor body is rotated at speeds sufficient to create the centrifugal forces needed for separation of two components in a solution. The rotor body 127 has a plurality of cavities 119 for receiving tubes containing the solution to be processed. The device 120 uses long thin, tube like transducer horns 122 to generate sonic waves. The transducer horns 122 may form part of a tube cap assembly, part of a lid arrangement, or be nested in a support frame. The transducer horns 122 can be of any appropriate material for achieving a desired frequency range. Because of the high centrifugal forces which are generated by the device 120, stainless steel and titanium are preferred materials for the horns 122.

The use of transducer horns is desirable because they are immersed into the solution having the components to be separated. A maximum amount of sonic energy will be imparted into the solution by the horns 122 with a minimum wave deflection or scattering. Because the transducer horns 122 are round, long and longitudinally centered within each tube 126, they impart an even distribution into the entire solution.

Figure 9:
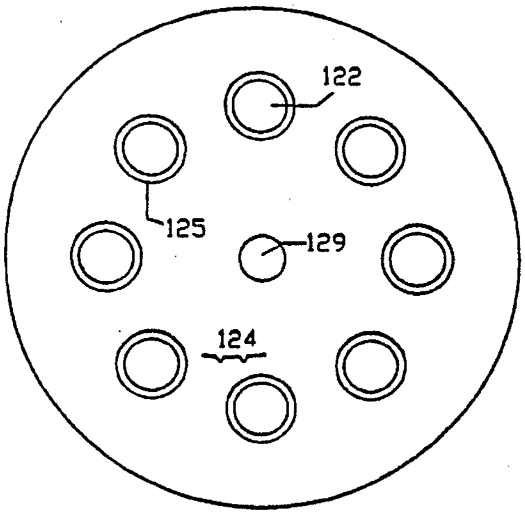
FIG. 9 is a top view of the device of FIG. 8.

As shown in FIGS. 8 and 9, an even number of transducer horns 122 are preferably used. The horns 122 are nested in a frame or rotor lid 124. Any suitable means known in the art may be used to hold the transducer horns 122 in place in the lid 124. For example, the lid 124 may have counter-sunk holes 125 for receiving and nesting the horns 122. The lid 124 is held in place with respect to rotor body 127 by a locking stud 129. An O-ring 121 is mounted within a groove 123 for biocontamination safety.

The head of each horn 122 has an electrode 128 for receiving power from a distributor cap-type arrangement 130 mounted to the underside of a stationary cover arrangement 132. The distributor cap-type arrangement 130 may be comprised of a set of transmitter elements 134 on the stationary cover arrangement 132 which interact with the receiving electrodes 128 on the horns 122. Alternatively, the distributor cap-type arrangement can be an inductance coil type device which creates a wireless electrical field between the distributor cap arrangement and the spinning horns and which imparts the horns with electrical power. Electrical power can be provided to the horns 122 as either a pulsed or steady state signal.

As before, separation of components within the solution is achieved by rotating the body 127 as a speed sufficient to generate a desired centrifugal force. Simultaneously, electrical power, in either a pulsed or steady state condition is supplied to the transducer horns for generating sonic waves, preferably ultrasonic waves, in the solution.

To insert and extract the transducer horns 122 from the rotor lid 124, it is necessary to use a customized tool 140. The tool 140 is needed because of the awkwardness of manually inserting multiple horns 122 into the rotor lid or frame while they are at an angle which can be as great as 45 degrees. The tool 140 is formed by a central member 142 with a handle 144, a slide mechanism 146 mounted to the central member 142, and retraction and insertion fingers 148 attached to the slide mechanism 146. Slide mechanism 146 may be manually actuated such as by finger grips 150 or powered to move between an extended position wherein the transducer horns 122 reside in the frame or lid and a retracted position wherein the transducer horns 122 are withdrawn partially or completely from the frame or lid.

Figure 10:
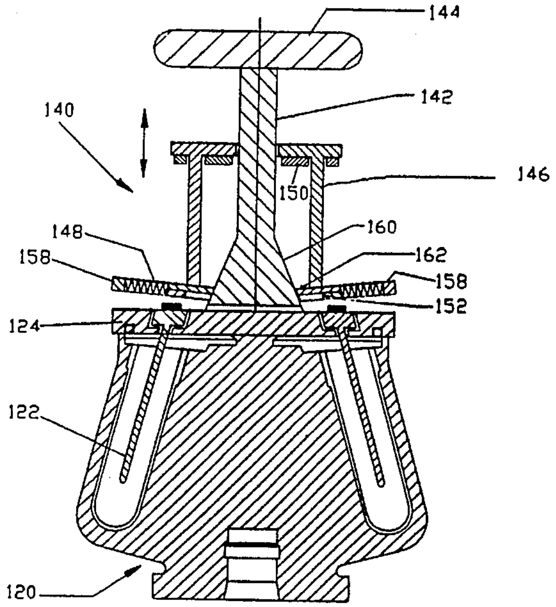
FIG. 10 illustrates a sectional view of a tool for removing the transducer horns of the device of FIG. 8.
Figure 11:
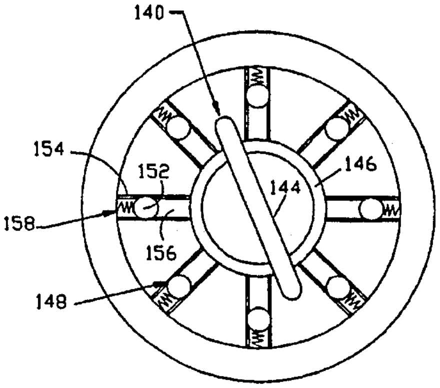
FIG. 11 illustrates a top view of the tool of FIG. 10 in partial cross section.

As shown in FIGS. 10 and 11, each finger 148 has a magnet 152 which grabs and holds the head of a respective transducer horn 122 during insertion and removal. Each magnet 152 is preferably mounted within a slider frame 154 which allows the magnet to move within the space 156 in each finger. Each finger 148 also has a compression spring 158 for forcing a magnet 152 inwardly as the slide mechanism is raised during extraction of the transducer horns. Each compression spring 158 may be mounted to an end wall of a respective finger 148 and a magnet 152 using any suitable means known in the art. For example, an end of the spring may be received in an aperture (not shown) in the magnet and an aperture (not shown) in the end wall.

The central member 142 has a tapered portion 160. Each finger 148 has a tapered end wall 162 which slides along the tapered portion 160. The tapered end wall is tapered at an angle corresponding to the taper angle of the portion 160 to facilitate movement of the fingers 148 along the central member and its tapered portion 160. This arrangement also acts to linearly translate the magnets 152 either inwardly or outwardly depending upon whether the transducer horns 122 are being inserted or extracted.

Figure 12:
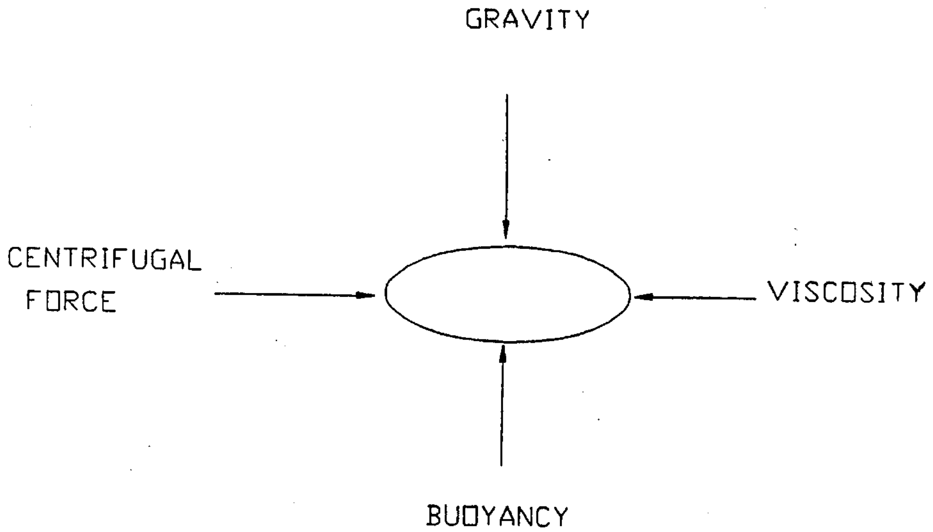
FIG. 12 illustrates the forces acting on a cell during centrifugation.
Figure 13:
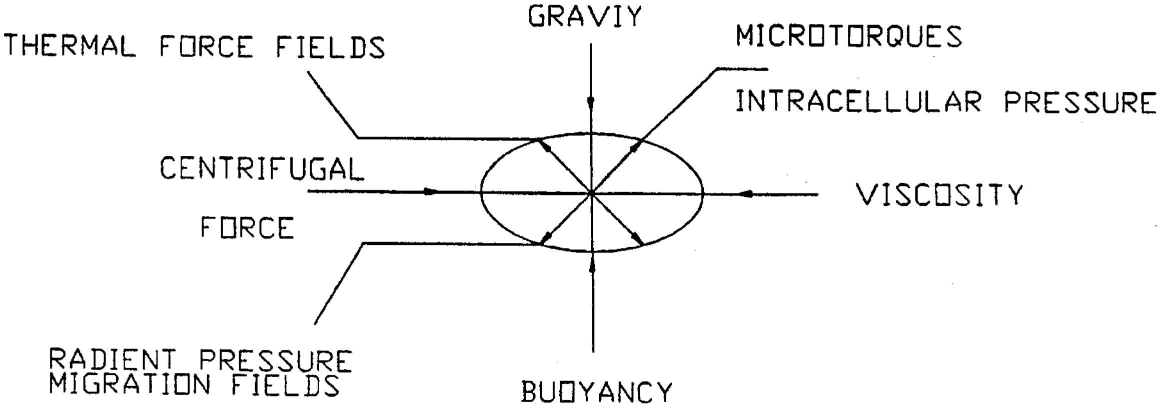
FIG. 13 illustrates the forces acting on a cell during the method of the present invention.

FIG. 12 illustrates the four main forces acting on a cell during centrifugation. The four main forces are gravity, buoyancy, fluid friction (viscosity) and centrifugal force. FIG. 13 illustrates the forces acting on a cell using the devices of the present invention. As can be seen from this figure, additional forces are applied to the cell. These additional forces include microtorque forces, internal cell pressure forces, pressure field migration forces, and thermal migration forces (lower viscosity).

The sonic waves or energy forces generated by the transducers in the various embodiments of the present invention create a sonic gradient in the solution within the test tubes or receptacles. The physical attributes of the sonic waves thus generated such as intensity, frequency, amplitude, duration, duty cycle, and pulse rate determine the effect of the sonic waves on the solution. It is important that the transducer attributes be controlled to optimize separation results. If desired, a microprocessor (not shown) can be provided to control the array of transducers. The microprocessor may be user programmable or operate on known default settings to ensure that the sonic wave(s) from an array of transducers was uniform in intensity, frequency, duration and the other physical attributes.

As previously mentioned, the transducers can either be designed to act as passive emitters or can be controlled as emitters and the receivers. In the case of the latter, the emission intensity can be regulated by the strength of the deflected and returned wave.

If desired, a photo-optical sensor array (not shown) may be incorporated into each test tube or receptacle to sense when a certain solution density gradient has been reached and to provide an appropriate control feedback signal to the microprocessor controlling the array of transducers.

Still another feedback signal device which could be incorporated into the centrifugation device of the present invention is an array of dedicated sonic receiver transducers which sense the sonic field generated in the centrifuge device and provide information needed to relocate and focus the sonic waves and thereby optimize the frequency and the intensity of the emitters. These receivers can be mounted either on the rotors or on the inner walls of the centrifuge chamber.

As can be seen from the foregoing, the present invention combines sonic energy forces with centrifugal force for separating, isolating, grouping, banding, and/or migrating biological, organic or inorganic solutions with cells or other particles. The foregoing description sets out various embodiments of centrifuge devices which combine sonic energy with centrifugal force for these purposes. The sonic energy which is supplied by the transducers incorporated into the centrifugation device, preferably ultrasonic energy, speeds up the centrifugation process and makes it more efficient.

There are many advantages to the present invention. By introducing another separating force into the separation process, the amount of centrifugal force necessary to separate a solution is greatly reduced. This enables centrifuge devices to be created with smaller diameter rotors which take up less lab space and allows scientists to run centrifuges at lower speeds to separate the same cell particles. The reduced centrifugal speed is particularly helpful in that a large part of the cost of a centrifugation device is the elaborate safety and containment systems needed to protect laboratory technicians and scientists. Centrifuges, when spinning, contain enormous amounts of kinetic energy which can literally kill anyone close during an accident. By lowering the speed at which centrifuges need to run, containment systems can be smaller, less refrigeration is necessary which reduces energy consumption, cost is lower per centrifuge, and the separation process is more efficient.

Other advantages to the present invention are less apparent. During centrifugation, cells must be kept alive for many applications. Large amounts of heat are given off by the typical centrifugation process, which heat can literally cook cells and kill them. This necessitates large bulky refrigeration systems for centrifuges or precooled rotors which aid in keeping cells alive. By introducing ultrasound energy vibration into the separation process, heat generation is reduced, the need for refrigeration is reduced, and power consumption is reduced. In addition, the amount of exhaust heat generated by the centrifuge is greatly reduced.

Another important factor in centrifugation is that cells, when they are separated into their components, are subjected to large amounts of shear force. If centrifuge acceleration or deceleration occurs too fast or too slow, these shear forces can rip cells and cell components with such force that the resulting particles are unusable for research purposes. Also, the shear forces may cause ripping which does not separate cell components clearly and discretely so as to cause the resultant particles to be of little or no use. An example of separating a cell into its components is the separation of a mitochondria cell. The cell is comprised of an outer membrane and an inner fluid with cell components suspended in the fluid. The cell membrane can be ruptured and separated from the fluid and the inner components by density gradient centrifugation because the cell membrane is more dense than the inner components. The inner membrane of the mitochondria can also be ruptured by ultrasonic shock waves without centrifugation. By combining centrifugation and ultrasonic energy forces together, a more efficient process of rupturing the inner and outer membranes and separating components by density gradient can be achieved. It is believed that a reduction of centrifugation times of 30–50% can be achieved using centrifugation coupled with the application of ultrasonic energy forces.

By combining ultrasonic and centrifugal energy, it is possible to centrifuge whole cell solutions at a given speed while subjecting them to ultrasonic energy. Once cell membranes are ruptured, then the natural density zone migration of subcellular particles can take place until the zonal process is complete. This type of process is more efficient than techniques currently being used and yields a higher statistical yield of homogeneous subcellular zone for experimentation.

In the realm of ultracentrifugation, spinning rotors and biosolutions at speeds over 60,000 rpm, genetic engineering has made great strides. In this realm, genetic engineering involves breaking the subcellular components of cells down to their very basic organic compounds, namely DNA and RNA chains. The speeds of ultracentrifugation along with the incredibly small yields during a single centrifugation run, make genetic engineering and research an extremely time consuming, lengthy and generally inefficient process. Again, the cost and energy consumption of such centrifuges, along with the inherent safety concern of having that much kinetic energy in a cramped lab, makes it a less than desirable science. By combining ultrasonic energy and centrifugation forces, it is likely that speeds can be reduced and yields of DNA, RNA and other genetic compounds and genes, can be efficiently isolated and separated during centrifugation. It is believed that yields by percent volume are significantly increased over pure sonification techniques.

It should be noted that large separators can be developed which would handle large volumes of solutions to be separated. Transducers could be large sheets of continuous piezoelectric or other material which circumferentially wrap around a spinning or stationary tank of solution and beam the sonic gradient inwardly.

It is apparent that there has been provided in accordance with this invention an improved separation device and separation process which fully satisfy the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A device for separating components within a solution which comprises:

means for applying a centrifugal force to said solution to separate a first component in said solution from a second component therein; and means for simultaneously applying a sonic energy force to said solution to enhance and increase the speed of the separation of said first component from said second component; and said centrifugal force applying,means comprising a centrifuge having a rotor body and a plurality of tube cavities machined into said rotor body for receiving at least one tube containing said solution; and said sonic energy force applying means comprises at least one transducer for emitting a sonic energy force into said solution.

2. A device according to claim 1 wherein said at least one transducer comprises a piezoelectric device.

3. A device according to claim 1 wherein said at least one transducer comprises a passive sonic wave emitting device.

4. A device according to claim 1 wherein said at least one transducer comprises a transducer horn immersed directly within said solution.

5. A device according to claim 1 wherein said at least one transducer comprises a device which acts as both an emitter and a receiver so as to regulate the intensity of the sonic energy force by deflected wave feedback control.

6. A device according to claim 1 wherein said at least one transducer emits a steady state sonic wave so as to migrate cells in said solution into bands at half wavelength intervals.

7. A device according to claim 1 wherein said at least one transducer emits a pulsed wave which is controlled to maximize separation of the components.

8. A device according to claim 1 further comprising: said at least one transducer being mounted to a wall of the rotor body and being aimed so as to a wall of the rotor body and being aimed so as to generate sonic energy forces in a radial direction towards the solution to be separated.

9. A device according to claim 1 further comprising:

said at least one transducer being incorporated within a wall of the rotor body and being aimed so as to generate sonic energy forces in a plurality of directions including perpendicular to (90 degrees) the longitudinal center line of said tube cavities, and parallel to the longitudinal center line of said tube cavites, or upon desirable angle in between perpendicular an parallel to the longitudinal center line of said tube cavities which said angle may produce maximum separation forces in said solutions and to said components.

10. A device according to claim 1 further comprising means for supplying at least one of electrical power and control signals to said at least one transducer while said rotor body is spinning.

11. A device according to claim 10 wherein said supplying means comprises at least one channel within the rotor body through which an electrical cable can be introduced.

12. A device according to claim 1 further comprising:

a cap associated with each tube containing said solution for keeping said solution within said tube; and said at least one transducer comprises at least one transducer incorporated into said cap so as to direct said sonic energy forces along a longitudinal axis of the tube with which said cap is associated.

13. A device according to claim 1 further comprising:

said centrifugal force applying means comprising a centrifuge device having a rotor body, means for rotating said rotor body at a desired speed, and means for receiving said solution pivotally mounted to said rotor body.

14. A device according to claim 13 further comprising:

said receiving means comprising at least one tube pivotally mounted to said rotor body;

each said tube having a cap for sealing an open end of said tube; and said sonic energy force applying means comprising at least one transducer incorporated into said cap.

15. A device according to claim 13 further comprising:

said receiving means comprising at least one bucket pivotally mounted to said rotor body;

each said bucket having a base and a lid and receiving an array of tubes containing said solution; and said sonic energy force applying means comprising an array of transducers, said array of transducers having the same configuration as said array of tubes.

16. A device according to claim 15 wherein said array of transducers is located in the base of said bucket.

17. A device according to claim 15 wherein said array of transducers is located in the lid of said bucket.

18. A device according to claim 15 wherein said array of transducers is battery powered.

19. A device according to claim 1 further comprising:

said centrifugal force applying means comprising a centrifuge device having a rotor body;

said rotor body having a plurality of cavities for receiving at least one tube;

a support member mounted to said rotor body; and said at least one transducer comprising a plurality of transducer horns nested within said support member.

20. A device according to claim 19 further comprising:

each said transducer horn being immersed directly within a solution contained by said at least one tube.

21. A device according to claim 20 further comprising:

means for supplying power in at least one of a steady state or pulsed condition to each said transducer horn.

22. A device according to claim 21 wherein said power supplying means comprises:

a receiving electrode mounted to each transducer horn; and a distributor cap arrangement having a plurality of emitter electrodes for creating an electrical field with said receiving electrodes.

23. A device according to claim 19 wherein:

said support frame comprises a lid mounted to said rotor body; and said lid has a plurality of counter sunk holes for receiving said transducer horns.

24. A method for separating a first component in a solution from a second component in a solution comprising the steps of:

applying a centrifugal force to said solution to separate said first component form said second component; and simultaneously applying a sonic energy force to said solution so as to speed up the separation of said first and second components and to increase the efficiency of the process; and said centrifugal force applying step comprising providing a centrifuge device having a rotor body and at least one tube for receiving said solution and rotating said rotor body at a speed sufficient to create a desired centrifugal force; and said sonic energy applying force comprising providing at least one transducer for emitting a sonic energy wave along a longitudinal axis of said at least one tube.

25. A method according to claim 24 wherein said sonic energy force applying step comprises applying an ultrasonic energy force to said solution.

26. A method according to claim 24 wherein said sonic energy applying force comprises radially directing said sonic energy applying force towards said solution.

27. A method according to claim 24 further comprising:

said centrifugal force applying step comprising providing a centrifuge device having a rotor body and at least one tube for receiving said solution and rotating said rotor body at a speed sufficient to create a desired centrifugal force; and said sonic energy applying force comprising providing at least one transducer for emitting a sonic energy wave along a longitudinal axis of said at least one tube.

28. A method according to claim 24 further comprising:

said centrifugal force applying step comprising providing a centrifuge device having a rotor body and at least one tube for receiving said solution and rotating said rotor body with said at least one tube position therein at a speed sufficient to create a desired centrifugal force; and said sonic energy applying force comprising providing at least one transducer immersed in said solution and powering said at least one transducer to generate a sonic energy wave within said solution.

29. A method according to claim 23 further comprising:

a rotor with tube cavities on angles perpendicular to the angle of rotation of said centrifuge, parallel to said angle of rotation of said centrifuge, or any angle in between perpendicular and parallel which would provide for the optimum separation banding, and containment of cellular and subcellular bio-materials which may be hazardous to humans or susceptible to contamination by ambient air and temperature.

30. A method according to claim 23 further comprising:

a said rotor with said tube cavities which are suitable for the sealing and containment of hazardous biomaterials and chemicals which would be affected by exposure to ambient air and temperature.

31. A method according to claim 23 further comprising:

a rotor and tube cavity arrangement whereby said centrifugal forces and said sonic forces act in such a desirable manner as to puncture, rupture or other wise separate bio-material, cells and cell membranes for the purposes of separation into density bands during said centrifugation and/or for the purposes of efficiently mixing cells or cell membranes or intra-cellular particles with reagents and chemicals for the purposes of biomedical tests and/medical tests.

32. A method according to claim 28 comprising: said immersed transducer horn is physically shaped in a tapered manner with varied outside diameter or in a straight manner with constant outside diameter, which shape will act to further separate, rupture, migrate, band and pelletize cells, cell membranes and intra-cellular particles.

33. A device according to claim 1 further comprising:

a rotor with tube cavities on angles perpendicular to the angle of rotation of said centrifuge, parallel to said angle of rotation of said centrifuge, or any angle in between perpendicular and parallel which would provide for the optimum separation banding, and containment of cellular and subcellular bio-materials which may be hazardous to humans or susceptible to contamination by ambient air and temperature.

34. A device according to claim 3 comprising: said immersed transducer horn is physically shaped in a tapered manner with varied outside diameter or in a straight manner with constant outside diameter, which shape will act to further separate, rupture, migrate, band and pelletize cells, cell membranes and intra-cellular particles.

* * * * *